(12) United States Patent
Kilibarda

(10) Patent No.: US 8,869,370 B2
(45) Date of Patent: Oct. 28, 2014

(54) SEQUENCED PART DELIVERY SYSTEM

(75) Inventor: Velibor Kilibarda, Birmingham, MI (US)

(73) Assignee: Comau, Inc., Southfield, MI (US)

( * ) Notice: Subject to any disclaimer, the term of this patent is extended or adjusted under 35 U.S.C. 154(b) by 594 days.

(21) Appl. No.: 13/151,684

(22) Filed: Jun. 2, 2011

(65) Prior Publication Data

US 2011/0314665 A1  Dec. 29, 2011

Related U.S. Application Data

(60) Provisional application No. 61/358,668, filed on Jun. 25, 2010.

(51) Int. Cl.
*B23P 11/00* (2006.01)
*G05B 19/418* (2006.01)
*B23P 19/00* (2006.01)
*B23P 21/00* (2006.01)

(52) U.S. Cl.
CPC ......... *G05B 19/41805* (2013.01); *B23P 19/001* (2013.01); *B23P 2700/50* (2013.01); *B23P 21/004* (2013.01); *G05B 2219/31036* (2013.01); *G05B 2219/31044* (2013.01)
USPC .......................................... 29/430; 700/242

(58) Field of Classification Search
CPC .............................. B23P 21/004; B23P 21/008
USPC .......................... 29/430; 700/95, 99, 213–244
See application file for complete search history.

(56) References Cited

U.S. PATENT DOCUMENTS

| | | | | | |
|---|---|---|---|---|---|
| 4,928,383 | A | * | 5/1990 | Kaczmarek et al. | 29/711 |
| 5,152,050 | A | * | 10/1992 | Kaczmarek et al. | 29/711 |
| 5,319,840 | A | * | 6/1994 | Yamamoto et al. | 29/430 |
| 6,336,582 | B1 | * | 1/2002 | Kato et al. | 228/102 |
| 6,705,523 | B1 | * | 3/2004 | Stamm et al. | 235/385 |
| 6,813,539 | B2 | * | 11/2004 | Morimoto et al. | 700/215 |
| 7,356,378 | B1 | * | 4/2008 | Huang et al. | 700/112 |
| 2002/0087226 | A1 | | 7/2002 | Boudreau | |

(Continued)

FOREIGN PATENT DOCUMENTS

| | | |
|---|---|---|
| DE | 102004057664 A1 | 6/2006 |
| DE | 102005062691 A1 | 7/2007 |

(Continued)

OTHER PUBLICATIONS

Notification of Transmittal, International Search Report and Written Opinion of the International Searching Authority dated Aug. 29, 2011 from the corresponding International Application No. PCT/US2011/039097 filed Jun. 3, 2011.

*Primary Examiner* — Jacob Cigna

(74) *Attorney, Agent, or Firm* — Young Basile Hanlon & MacFarlane P.C.

(57) ABSTRACT

A system and method for sequencing component part delivery for use in assembling vehicle bodies arranged in a substantially random assembly sequence. The system and method includes a plurality of kit carts that are loaded or stocked with vehicle specific parts in a sequence or staging area of an assembly facility. The vehicle specific stocked carts are arranged and positioned to a coordinated vehicle to assemble the vehicle using the kit carts that move along in sequence with the vehicle as the vehicle is assembled along an assembly line. As the carts are depleted of parts, the carts are returned for restocking and assigned to a subsequent vehicle.

20 Claims, 6 Drawing Sheets

(56) References Cited

U.S. PATENT DOCUMENTS

| | | |
|---|---|---|
| 2002/0103569 A1 | 8/2002 | Mazur |
| 2004/0002788 A1 | 1/2004 | Morimoto et al. |
| 2005/0025612 A1 | 2/2005 | Ehrenleitner |
| 2005/0044700 A1 | 3/2005 | Ghuman et al. |
| 2009/0118858 A1* | 5/2009 | Wallace et al. ............... 700/110 |

FOREIGN PATENT DOCUMENTS

| | | |
|---|---|---|
| EP | 201262 A1 * | 11/1986 |
| EP | 1362663 A2 | 11/2003 |
| EP | 1426275 A1 | 6/2004 |
| JP | 10101222 A | 4/1998 |
| WO | 2007077056 A1 | 7/2007 |

* cited by examiner

SEQUENCED PART DELIVERY SYSTEM

CROSS-REFERENCE TO RELATED APPLICATION

This application claims priority benefit of U.S. Provisional Patent Application Ser. No. 61/358,668 filed on Jun. 25, 2010, the entire contents of which is incorporated herein by reference.

TECHNICAL FIELD

The present invention generally relates to the field of vehicle manufacture and assembly.

BACKGROUND

Traditional high volume manufacture and assembly of machines and vehicles has occurred in large assembly plants. These assembly plants have included multiple assembly lines where components are gathered, assembled and connected together. In the manufacture and assembly of vehicular bodies, the bodies typically include a skeleton of sheet metal components that are welded together through resistance spot welding, seam welding and brazing techniques to form what are commonly called "body-in-white" (BIW) structures.

With the growing need to efficiently build vehicles and accommodate varying consumer demand, assembly plants have strived to employ flexible build processes so that different vehicles, or vehicle bodies, can be built along the same assembly lines. The ability to quickly change over from building one type of body to another causes significant difficulty for facilities due to the limited amount of space around assembly lines and the time required to change over equipment and components that are specific to one vehicle body.

Due to these difficulties in logistics and time, manufacturers have employed either batch-type vehicle builds where a certain number of one vehicle body is assembled before changing the equipment and components so a different vehicle body can be assembled. In order to accomplish this, bins or racks containing many individual components or subassemblies specific to a particular vehicle were positioned next to an assembly cell or build station along the assembly line. As shown in FIGS. 1 and 2, if, for example, different vehicle bodies A, B and C were to be built, bins for storing or staging components for a build cell specific to a vehicle body would have to be positioned proximate to the build station. On changing from one vehicle type to another, for example for vehicle type A to vehicle type B, the bin A would have to be moved aside so the bin containing the B vehicle-type components could be positioned next to the assembly cell for convenient transfer by hand or automated robot. Where three, four or more different vehicles types are built along an assembly line, it is problematic and burdensome to logistically keep many bins of different parts next to each assembly cell. This causes congestion on the plant floor and further complicates the changeover process.

Alternately, and in a further effort to meet varying consumer demand, vehicle builds were conducted in a random build sequence where every next vehicle to be built was different than the one prior. Such random build sequences required coordinating the sequencing of build parts in a particular part rack to match the selected vehicle build sequence. For example as generally shown in FIG. 3, if a body type A was to be built followed by a body type B, then C, an individual bin at an assembly cell would include parts A, B and C organized or staged in the bin in the specific order the vehicles were to be built. An example of this sequenced bin is shown in FIG. 1. This required significant planning, coordination and staging of the parts in the individual bins prior to delivery to the assembly line and careful selection of the parts from the bin on the assembly line to ensure the proper vehicle specific part was removed from the bin and used in the assembly cell. Such coordination and staging was time consuming, costly and susceptible to a high occurrence of error.

Thus there is a need to improve on the system for efficiently achieving the desired random build sequence that reduces or eliminates the above difficulties and problems.

BRIEF SUMMARY

The present invention includes a system for sequenced part delivery useful in assembling vehicles. The present invention allows increased flexibility in the manufacture and assembly of, for example, vehicle body structures regardless of the vehicle architecture or body style and the sequence that the vehicle bodies are to be built. The present invention further greatly simplifies the assembly plant floor in the area of the assembly lines making for a more efficient and logistically compact assembly plant.

In one example of a method for sequenced part delivery to support assembly of a vehicle body structure or sheet metal skeleton, individual vehicle components or subassemblies for at least two different vehicle styles are gathered and staged in a material sequencing area. Vehicle style specific parts are loaded onto to kit carts and sequenced in order of the predetermined vehicle build order. The kits carts are then connected to a conveying source and moved in sequential line with the vehicle bodies in process on the main assembly floor along an assembly line. The individual kit carts are moved in sequence along with the vehicle in process along the assembly line as parts are progressively removed at assembly cells until the parts on the cart are depleted. The carts are returned to the material sequencing area for reloading for another vehicle of the same type or another type.

In another example, the kit carts are connected or docked to a conveyor source, for example and floor conveyor, an elevated conveyor or an automated guided vehicle (AGV) which is preprogrammed to remain substantially adjacent to the vehicle body as it progresses through sequential assembly cells along the assembly line.

In another example, a buffer zone or area is included to temporarily queue the kit carts along the assembly line to adjust to any temporary interruptions in movement of the vehicle body assembly line.

In one example of a system for sequenced delivering of vehicle parts to support assembly of vehicles in a substantially random vehicle style build order, a plurality of kit carts are provided which are loaded or stocked with components specific to a vehicle style. The carts are stocked in a material sequencing area and are sequentially ordered according to a predetermined vehicle style build schedule. The carts are driven and guided to remain substantially adjacent and follow the assigned specific vehicle style along the assembly line until the parts on the cart are depleted. The carts are returned for restocking and reordering for continued use.

In one example of the system, a plurality of assembly cells having robots are used to progressively remove parts from the cart and install and connect the parts to the vehicle body in process at the particular assembly station.

In another example, first and second conveyor systems are used to separately, but in coordinated fashion, move the vehicle body in process and the associated kit cart along an assembly line, or lines, to support the efficient assembly of a vehicle body or subassembly therefore.

In one example, a plurality of kit carts are used in separate closed-looped paths to support multiple predetermined assembly lines.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Referring to FIGS. 4-10 a system for sequenced part delivery useful in manufacturing and assembling machines is illustrated and examples explained below.

Figure 4:
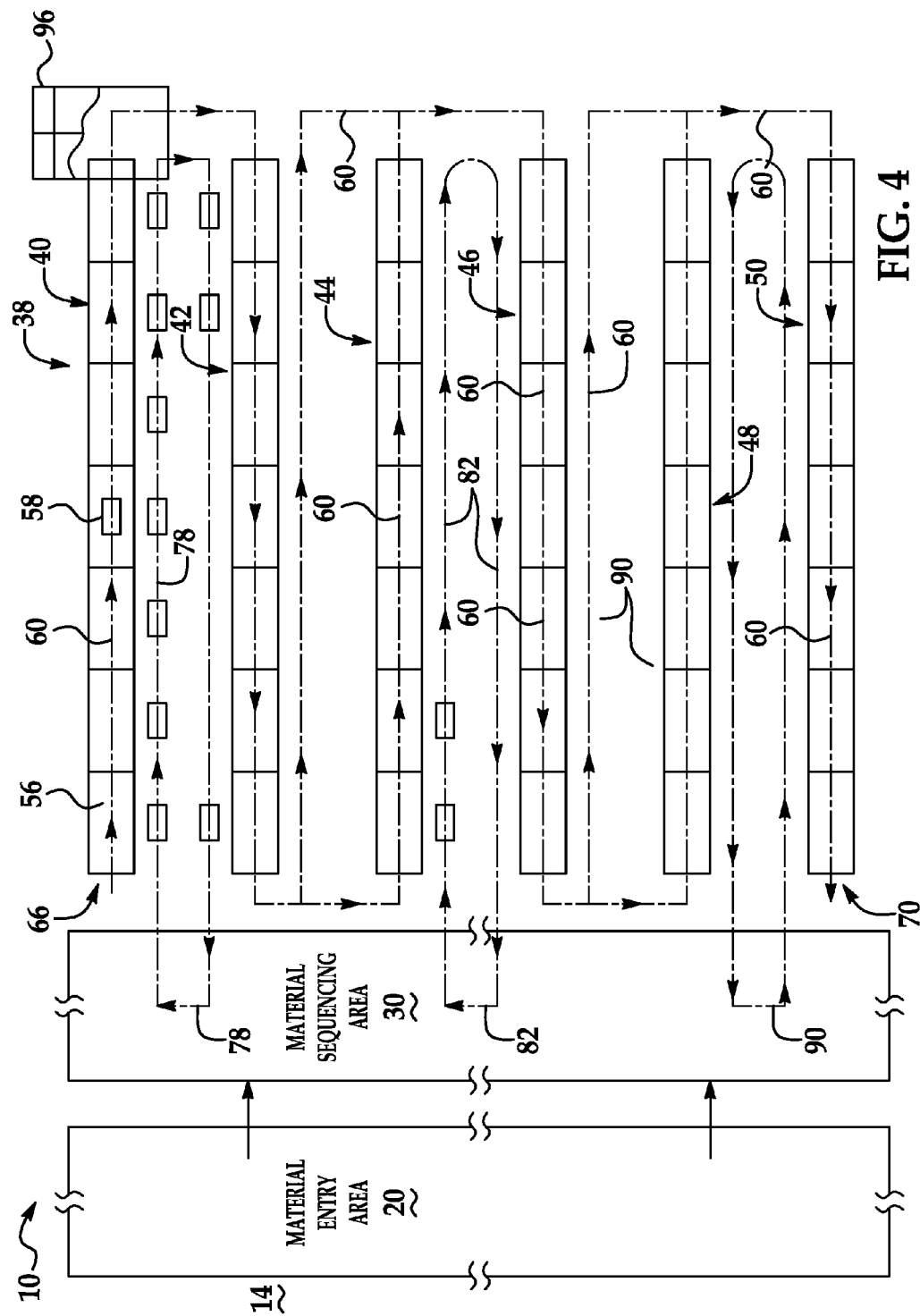
FIG. 4 is a schematic of an example of an assembly plant floor plan for BIW's using one example of the present inventive system.

Referring to FIG. 4, an example of a sequenced part delivery system 10 useful on an example of assembly plant floor 14 for body-in-white (BIW) vehicle body structures 58 is shown. In the example, the system 10 includes a material entry area 20, a material sequencing or staging area 30, and a plurality of main assembly lines 38 (six shown and identified as 40, 42, 44, 46, 48, 50). Each assembly line 38 includes a vehicle travel path 60 running down each line 40-50. In the example shown, there is an assembly line starting position 66 and an ending position 70 with path 60 having generally a serpentine path selectively through assembly lines 40-50 as generally shown. Other assembly line 38 configurations, orientations and vehicle paths 60 known by those skilled in the art may be used.

In one example, material entry area 20 is a large area in the assembly plant 14 used for the organization and storage of individual components or subassemblies of components (not shown) which are to be assembled and connected together at selected assembly cells or build stations 56 (seven stations for each line 38 shown) at the assembly lines 38 to produce a machine, for example, an automotive vehicle body 58. It is contemplated that many different components and subassemblies for different vehicle body types, for example A, B and C, are input, organized and stored in area 20 until needed for production build of the vehicle body 58. The material entry area 20 has suitable ingress and egress points to easily move large quantities of components and subassemblies into and out of the area 20 as needed. Other features such as storage racks and other logistical, inventory and organizational features known by those skilled in the art may be used.

Figure 5:
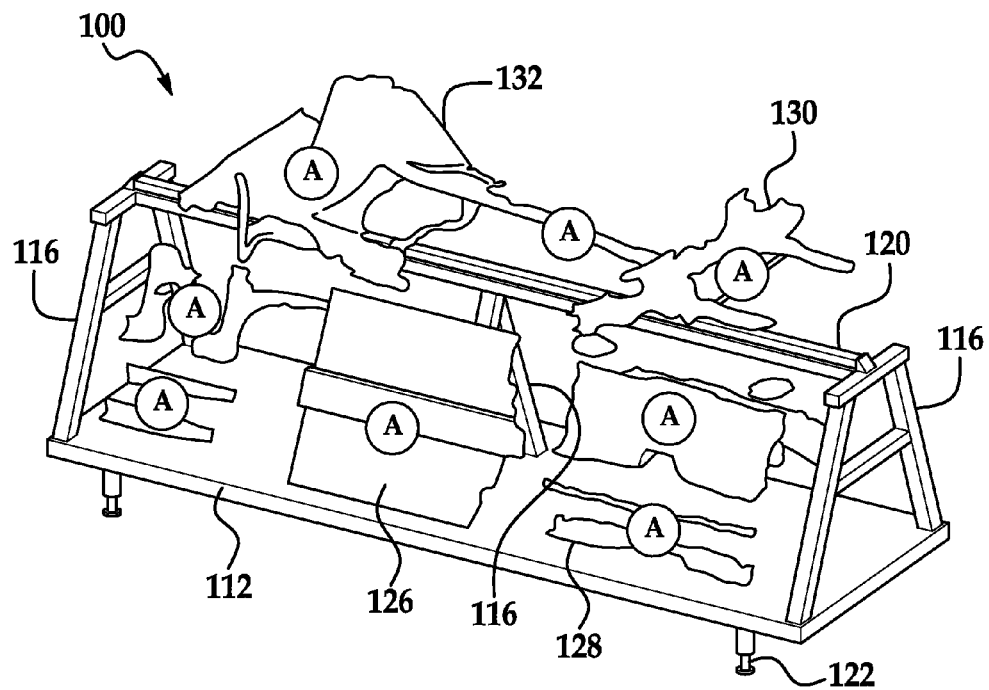
FIG. 5 is a schematic perspective view of an example of a component cart useful in the inventive system.

Referring to FIG. 5, one example of an assembly kit cart 100 used with the sequencing system 10 is illustrated. In the example, cart 100 includes a base 112, lower supports 116 connected to the base and extending upward and an upper support 120 connecting to the lower supports as generally shown. Stands 122 supporting cart 100 in a substantially horizontal position may be used where it is desired that the cart 100 be stationary, for example when loading parts onto the cart as described below. In a preferred example, cart 100 is selectively loaded or stocked with a plurality of components and/or subassemblies that are vehicle or body style specific, for example a first component 126, a second component 128 and a subassembly 130 for vehicle body type A and other parts for vehicle A as generally shown. The components and subassemblies can be positioned on the cart base 112, on the upper support 120 or other areas of the cart that allow for secure transport through sequencing area 30 and along assembly lines 38 and provide easy access for transfer of parts 126 and 128 from the cart 100 to the appropriate assembly cell 56 or other desired area. As described in more detail below, the plurality of kit carts 100 follow the predetermined vehicle body 58 build sequence along the main assembly lines 38. As an assigned or dedicated kit cart 100 follows the vehicle through a certain portion of the build process, the present invention can accommodate a random or highly variable build sequence to more closely match the needs of the consumer or vehicle delivery requirements.

Figure 6:
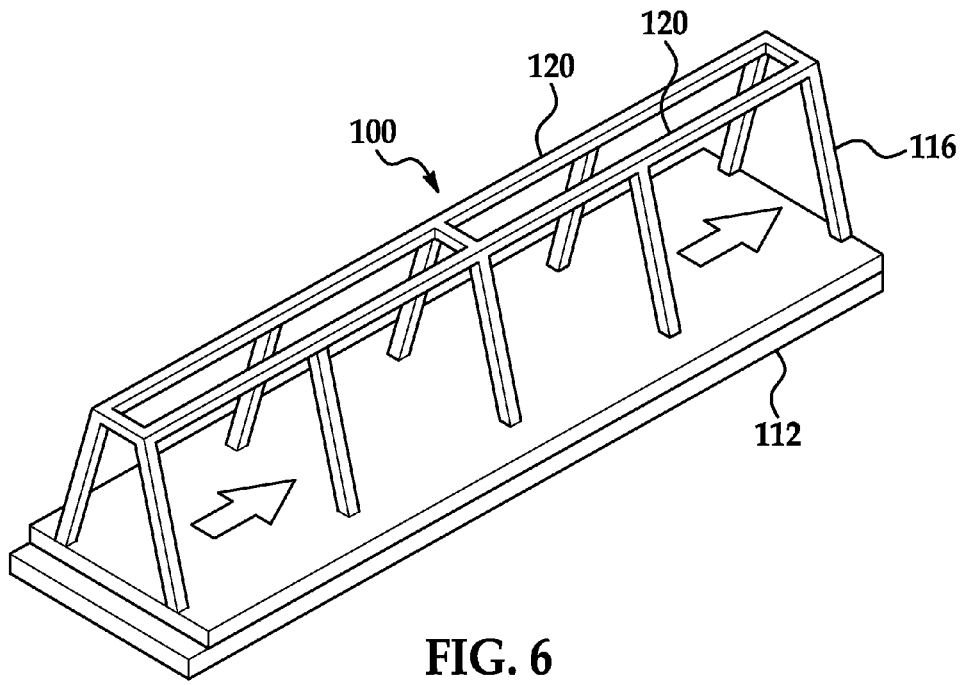
FIG. 6 is an schematic perspective view of an alternate example of the cart shown in FIG. 5.

An alternate form of cart 100 is shown in FIG. 6. In this example, the cart includes a base 112 and several lower supports 116. Upper support 120 includes two substantially parallel and planar upper supports 120 as generally shown. Both examples of carts 100 are made from durable materials such as steel or aluminum for industrial duty in an assembly plant environment. It is understood that different configurations of cart 100, including the base and upper and lower supports may be used to suit the particular components, vehicle and environment without deviating from the present invention.

Figure 7:
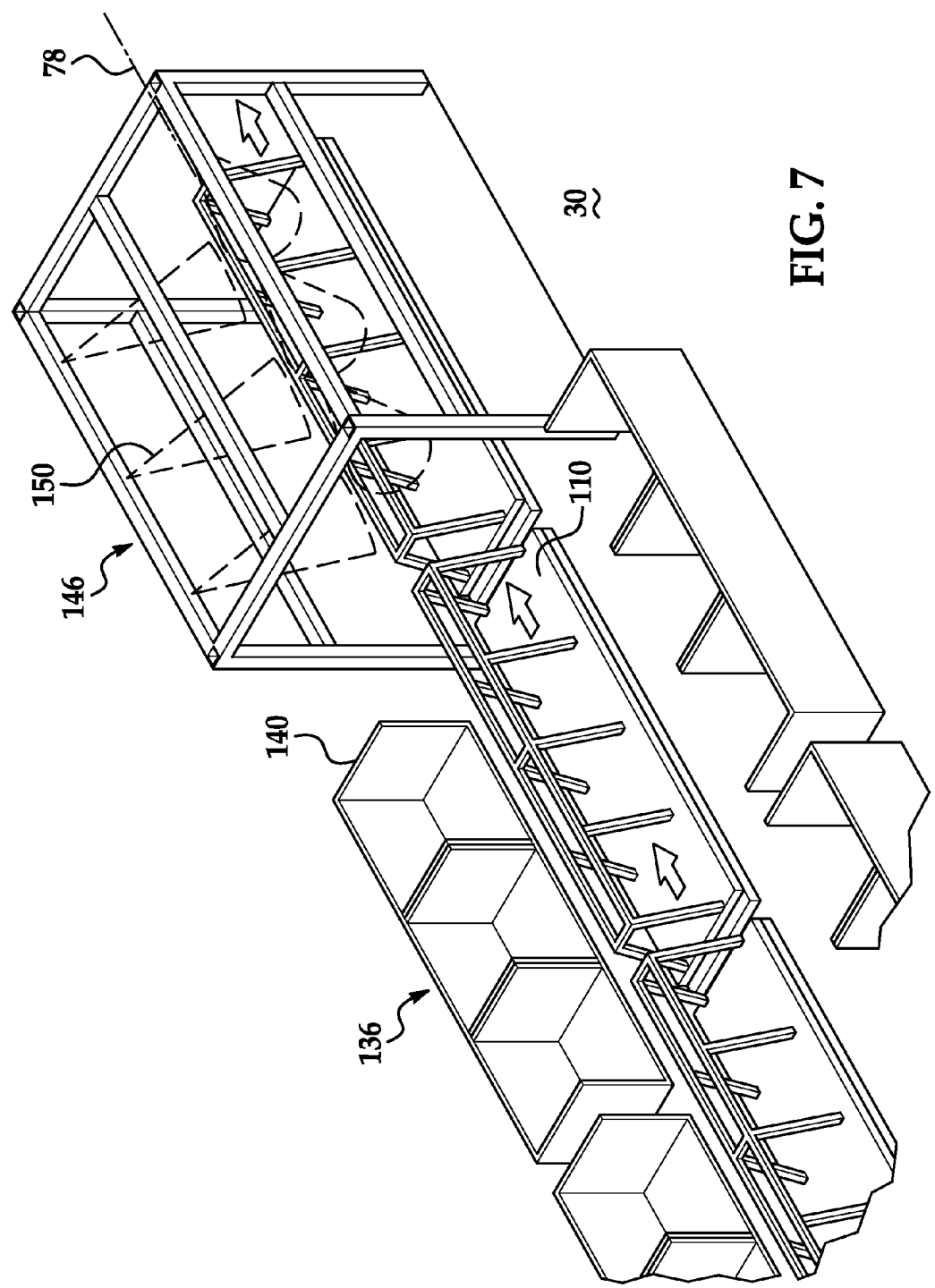
FIG. 7 is a schematic of an example of a part staging area useful with the present invention.

Referring to FIGS. 4 and 7, the illustrated example of system 10 further includes a material sequencing or staging area 30. In a preferred example, this is a large area in the assembly plant 14 positioned adjacent to the material entry area 20. Sequencing area 30 is structured so that individual components, for example 126, or partially assembled subassemblies, for example 130, can be transferred from material entry area 20 to sequencing area 30, selectively and loaded onto carts 100 and staged for movement onto the main assembly line floor. As best seen in FIG. 7, one example of area 30 would include a staging area 136 where multiple bins of parts 140 would be positioned so that workers or robots could remove parts from a particular bin and position the part in a selected or predetermined place on cart 100. As explained, in the preferred example, the parts or subassemblies that are loaded onto a cart 100 would all be parts for the same vehicle or body type, for example body type A shown in FIG. 5.

At the time of loading a particular kit cart 100 with the vehicle appropriate components, the cart 100 would be aligned or sequenced, in area 30, in an order that would match the selected or predetermined order of vehicles that will be built along the assembly lines 40-50 on the assembly plant floor 14 as further described below. In one example, control checks, for example vision systems 150, could be employed to visually ensure or track that the appropriate components have been loaded onto a cart 100 and/or that the carts 100 are in the proper order sequence before being released toward the assembly lines 38. Other quality control checks or systems, such as bar coding, RFID and other systems known by those skilled in the art can be used.

In one example, movement of components and subassemblies between area 20 and area 30 may be by traditional means, for example fork lift devices (not shown). In other examples, one or more floor-level or elevated conveyors (not shown) may be used to transfer bins, crates or pallets to selected positions in area 30. As best seen in FIG. 7, in area 30, kit carts 100 may be positioned on one or more floor or other linear conveyors, powered roller systems, or powered pallet conveyor systems (not shown). Other means or methods of transferring or guiding carts 100 through areas 20, 30 and/or along assembly lines 38 include may include automated guided vehicles (AGV's) or other programmed or guided transfer systems known by those skilled in the art. Such conveying devices may be controlled by individual or centralized control systems which are preprogrammed to control and monitor the movement of the conveyors, robots and other plant equipment associated with the vehicle and/or kit carts connected thereto. Such control systems may be powered and exchange information directly through traditional means such as wire harnesses or may communicate through wireless, cloud-based communication systems and protocols. One example of such wireless or cloud-based system includes U.S. Patent Publication No. US 2010/0241260 assigned to the assignee of the present application and incorporated herein by reference.

Figure 1:
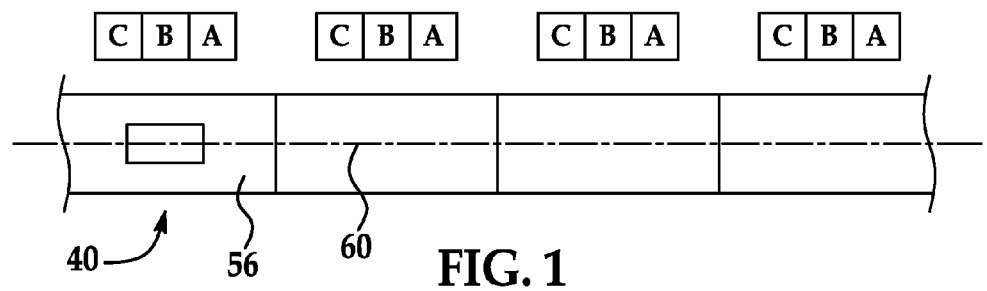
FIG. 1 is schematic partial view of a prior art assembly line.
Figure 2:
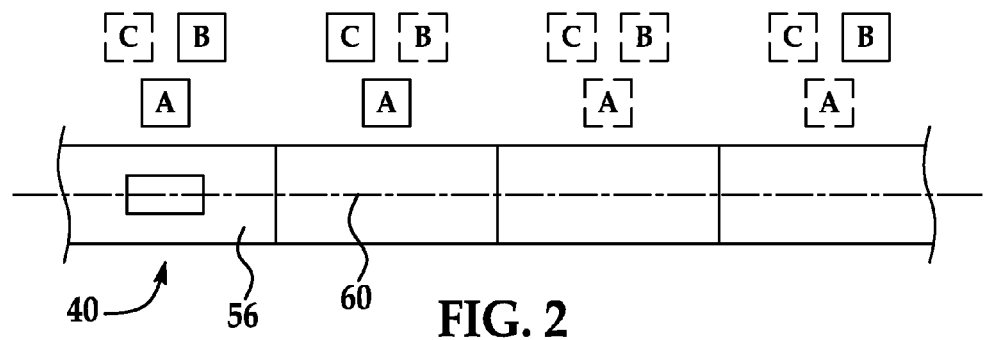
FIG. 2 is a schematic of an alternate prior art assembly line shown in FIG. 1.
Figure 3:
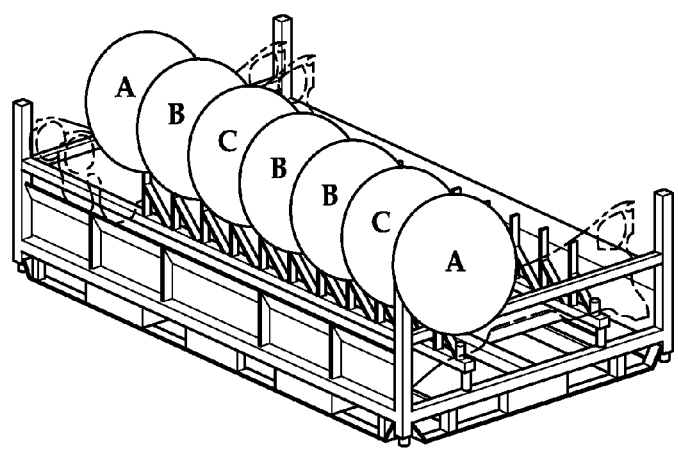
FIG. 3 is a perspective view of a prior art part bin used with the assembly line shown in FIG. 1.
Figure 8:
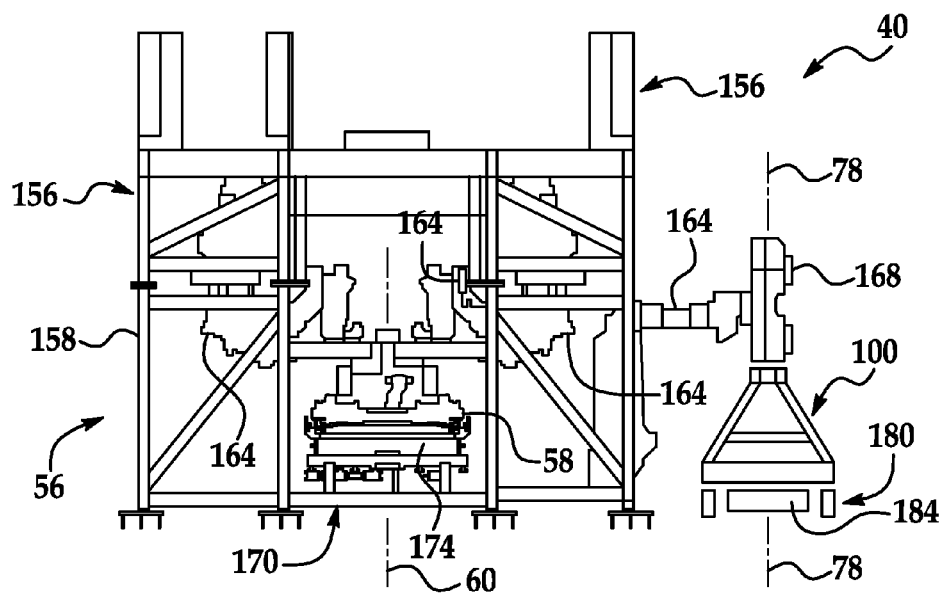
FIG. 8 is a schematic end view of an assembly line cell or build station using one example of the inventive system.
Figure 9:
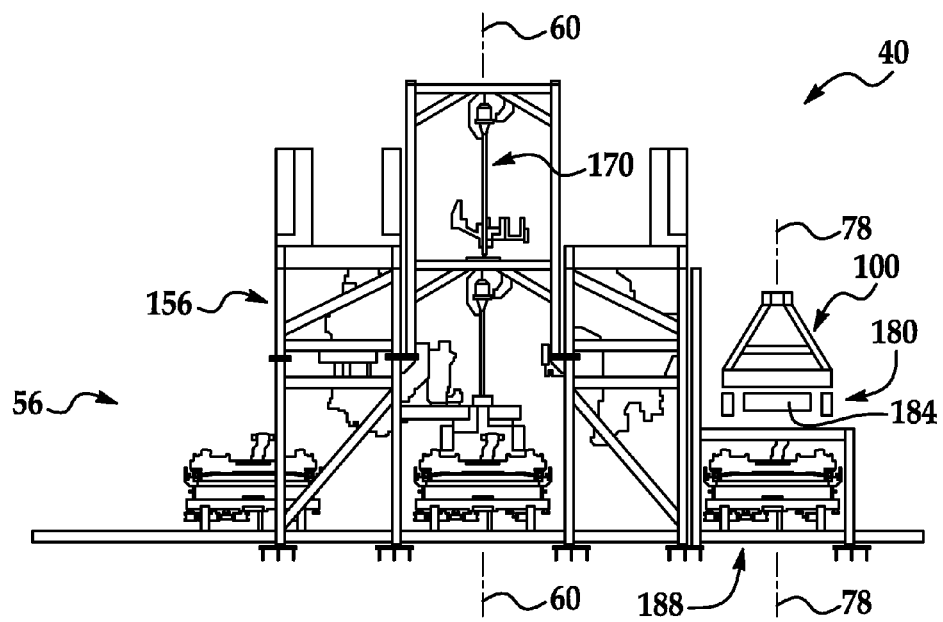
FIG. 9 is an alternate schematic end view of build station shown in FIG. 8.

As seen in FIGS. 4, 8 and 9, by having the many individual parts or components 126, 128 and subassemblies 130 stored in areas 20 and 30, and not beside the assembly lines 40-50 as was the case in prior designs illustrated in FIGS. 1 and 2, the amount of space and logistical congestion in the main assembly area 38 is greatly reduced. As there is less space needed for the storage of parts adjacent the assembly line, assembly facility aisle widths can be much smaller requiring less floor space in the area of the assembly lines 40-50 and a more efficient facility is achieved over prior art designs. It is estimated that in some configurations, assembly line 38 aisle widths may be up to 50% narrower than prior designs.

Referring to FIG. 4, an example of multiple assembly lines 40-50 is illustrated. In the example, six main assembly lines 40, 42, 44, 46, 48 and 50 are shown. In a preferred example, a vehicle BIW 58 to be assembled begins at a first end 66 and progresses through or by the remaining assembly lines in a generally serpentine or zigzag path 60 as generally shown exiting the group of assembly lines at end 70. In the example shown, assembly lines 40-50 assemble a vehicle body-in-white consisting of the sheet metal skeleton of an automobile. Other devices and machines could be assembled.

In one example shown in FIG. 4, the main assembly lines are grouped to form three separate circular kit carts paths 78 (positioned between assembly lines 40 and 42), 82 (positioned between assembly lines 44 and 46) and 90 (positioned between assembly lines 46 and 48) for passage and use of the kit carts 100. In a preferred example, assembly line 40 is an underbody geometry build line, and line 42 is an underbody welding respot line; line 44 is a right-hand body side build line and line 46 is a body framing build line; line 48 is a left-hand body side build line and line 50 is a body framing welding respot line. Other build sequences, assembly line orientations and configurations, and paths of movement of the vehicle body 58 and kit carts 100 known by those skilled in the art may be used. In the preferred example more fully described below, kit carts 100 carrying parts 126, 128 and/or subassemblies 130 specific to a vehicle body 58 travel along in side-by-side fashion next to its coordinating vehicle body 58, from assembly station 56 through assembly station about the respective cart 100 predetermined circular cart path 78, 82 or 90, where selected parts from the respective carts are removed at the appropriate build station 56 and assembled and connected to the other parts of the vehicle 58.

Referring to FIGS. 8 and 9, examples of assembly cells or build stations 56 positioned along assembly lines 40-50 are illustrated. Referring to FIG. 8, build cell 56 may include an assembly structure or scaffold 156 having a frame 158 on both sides and above the vehicle body travel path 60. The vehicle body 58, or other machine progressively being assembled, is progressively moved along travel path 60 by a conveyor system 170, preferably in the form of a driven pallet or platform 174 (shown in FIG. 8) or a driven overhead suspension trolley (shown in FIG. 9) supporting the vehicle body. Examples of such conveying systems are described in U.S. Pat. Nos. 6,788,673; 6,966,427; 7,232,027 and U.S. patent application Ser. No. 12/262,722 all assigned to the assignee herein and all are incorporated by reference. Other conveying systems known by those skilled in the art may be used.

Industrial robots 164 used to pick up and position parts may be positioned along side path 60. Robots 164 may include interchangeable end effectors 168 which weld, glue, include fixtures to hold or position parts or otherwise connect the parts together. As shown in FIGS. 4 and 8, cart path 78 is positioned to the right side of assembly line 40 and vehicle path 60. In this example, carts 100 are positioned and transported substantially at floor level or slightly above to allow for the selected transfer system, for example a conveyor 180 and driven pallet or platform 184, AGV or other systems described above to support and move cart 100 along path 78, or other predetermined and exemplary cart paths 82 and 90. It is understood that the cart paths 78, 82 and 90 can be positioned in other areas or orientations from vehicle line 60.

In the example, cart path of travel 78 is positioned such that robot 164 is capable of removing from the cart 100 the appropriate components 126-128, and/or subassemblies 130 needed at that build station 56 to progress the assembly of vehicle 58. As the vehicle body 58 progresses along vehicle path 60, or momentarily stops to complete the required assembly, the coordinating or sequenced cart 100 with vehicle part specific components equally progresses or momentarily stops, staying side-by-side or substantially thereby, the vehicle body 58 until the vehicle body leaves the cell or station to move onto the next phase of assembly, the cart 100 exhausts its part supply, or some other predetermined condition is satisfied.

As best seen in FIG. 4, cart paths 78, 82 and 90 are preferably closed loops. The start of the path will begin in sequencing area 30 where the cart 100 is loaded or stocked with the vehicle specific components and then sequenced to match the appropriate vehicle body as previously described. For vehicle bodies beginning the assembly cycle, the loaded cart 100 then exits area 30 and enters start position 66 at the beginning of assembly line 40. The cart 100 is guided or driven along cart path 78 to first pass along side assembly line 40 and then is turned around to reverse direction to travel next to assembly line 42. In one example, after completing its path along assembly line 40, cart 100 may be maneuvered to be adjacent to the next line 42 which exposes the other side of the cart 100, and additional parts 126, 128 and/or subassemblies 130 for ease of access and use along line 42 on its way back toward area 30. On completion of passage along line 42, cart 100 is transferred back to area 30 to be reloaded and sequenced with another vehicle body 58 to be built.

In one example of cart path 78, a buffer area 96 is included at the end of first assembly line 40. The buffer area is capable of storing subassemblies that have completed the build process of assembly line 40 and are temporarily delayed from entering the first build station in the second assembly line 42. This buffer allows for the variances in the progression of the coordinated assembly lines to ensure there is always another vehicle body 58 available to progress to the next assembly line in the event, for example there is a stoppage in line 40 while line 42 continues. Other methods of ensuring a consistent flow of vehicle bodies 58 to the next assembly line or build station known by those skilled in the art may be used.

Referring to FIGS. 4 and 5, in one example, the output or completed subassembly 132 from assembly line 40 can be removed from the assembly line 40 and placed on cart 100 by a robot or other transfer device (not shown). As the cart turns around or reverses direction to begin travel down the successive assembly line 42, a robot can remove the subassembly 132 from the cart and position it in the first build station along line 42. In one example, carts 100 may be used to support the subassemblies 132 completed in line 40 by storage on the carts 100 positioned in buffer area 96 until line 42 is ready for the buffered or temporarily stored subassembly as described. This multi-purposing of cart 100 further increases efficiency in the build process and eliminates congestion on the plant floor without separate AGVs or other devices that would otherwise be needed to transfer the assembly 132 and keep the line moving. In an alternate step, where buffer 96 is used, assembly 132 can be taken from the buffer and placed on the cart 100.

The other two cart paths 82 and 90 are similarly designed and operated as described for path 78 although may vary to accommodate the specific components and build process as known by those skilled in the art.

Referring to FIG. 9, an alternate example of the assembly line 40 and assembly cell 56 is shown. Here, suspended robots 164 are used with scaffolding to further decrease plant floor congestion. An example of this is U.S. patent application Ser. No. 12/262,722 assigned to the assignee herein and is incorporated by reference. In the example, cart 100 is elevated well above structure 188 at the plant floor level as generally shown. In one example, the carts 100 are elevated about 1.5 meters above the working assembly plant floor 14. This may be useful in situations where tooling or other equipment needs to be on the floor level next to the assembly cell, or it is more convenient and efficient to have the components 126, 128 and subassemblies 130 positioned above the floor. It is contemplated that either or combinations of both floor level and elevated cart paths may be used depending on the particular vehicle build requirements. Other transfer equipment and systems known by those skilled in the art may be used.

Figure 10:
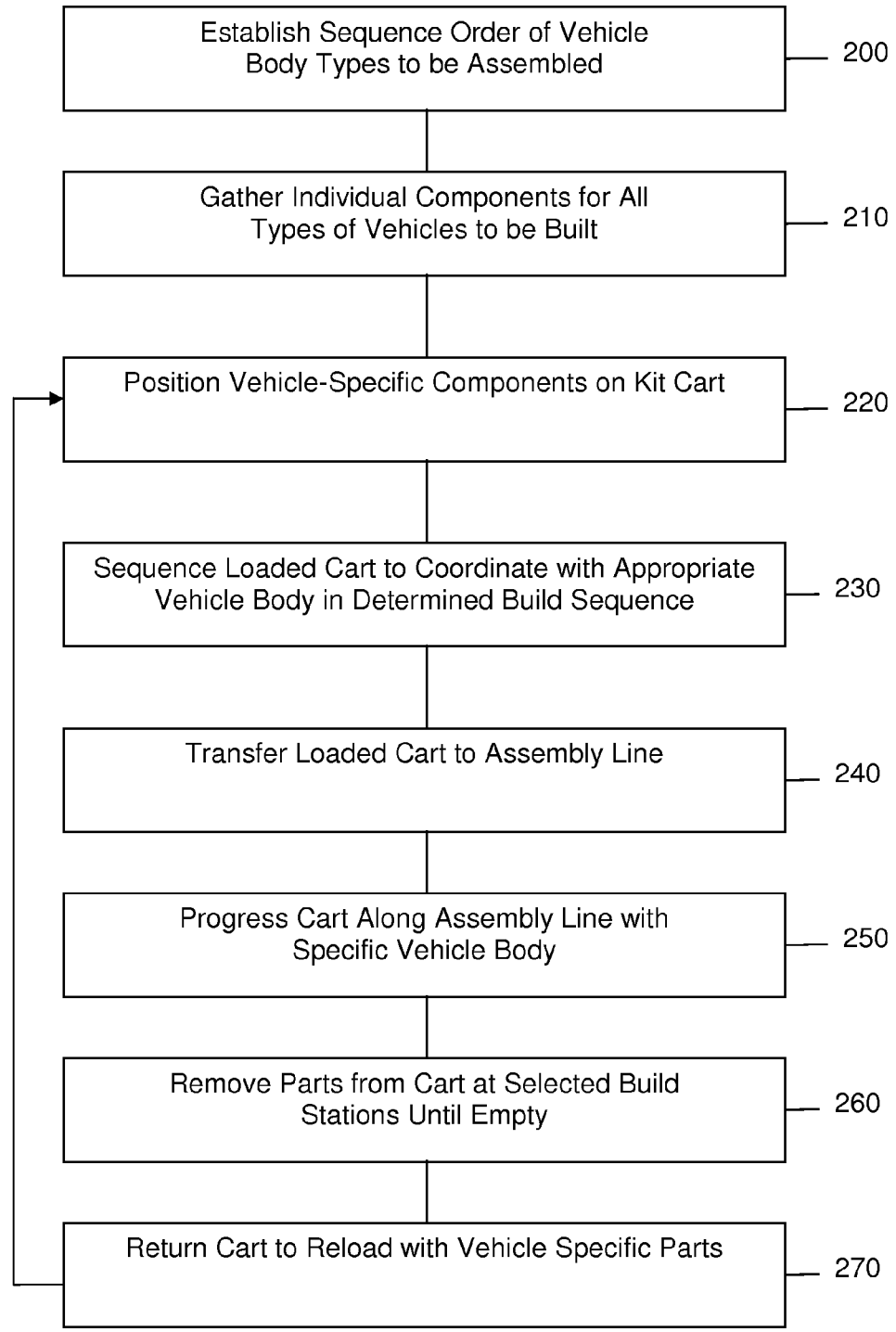
FIG. 10 is a flow chart of an example of the process steps in the inventive system.

Referring to FIG. 10, an example of the process or method of operation of the sequencing part delivery system 10 is schematically shown.

In step 200, a manufacturing and assembly plant predetermines the order that machines, for example, automobile sheet metal bodies, are to be built for a work shift or day. In step 210, the appropriate individual components or subassemblies are gathered, organized and stored in a material entry area 20 as generally described above. Although shown in FIG. 4 with an assembly line only to one side of areas 20 and 30, it is understood that areas 20 and 30 could be positioned between separate banks or arrays of main assembly line areas 38 on plant floor 14. For example, area 20 could be used for entry of subassemblies from an adjacent main assembly line (not shown) instead of individual components. These subassemblies could then be transferred to an area 30 and then to other main assembly lines 40-50 as shown and described in FIG. 4.

In step 220, the appropriate components and/or subassemblies are transferred to a sequencing area 30. Kit carts 100 are selectively loaded with vehicle body-specific parts 126, 128 and/or subassemblies 130 to coordinate or match the predetermined vehicle build sequence in step 200. In step 230, the loaded carts 100 are placed in order or are staged in area 30 as best seen in FIG. 7 before being transferred out onto the main assembly line floor.

In step 240, the loaded carts 100 are transferred from area 30 onto the main assembly area. The kit carts are engaged with or docked with a conveying device, for example, a floor or elevated linear conveyor or an AGV. Depending on the parts on the cart 100, the individual carts will be transferred to the appropriate paths, for example one of cart paths 78, 82 and 90, to position the carts with the appropriate vehicle body and at the appropriate stage or level of build suitable for the parts on the cart. Once positioned along the appropriate assembly line and specific vehicle, the respective carts 100 are moved (or driven) along with the specific vehicle body from build station 56 to build station in step 250 as the vehicle body 58 is progressively built. In step 260, at each successive build station 56, the appropriate parts 126, 128 and/or subassemblies 130 are removed from the cart 100 and positioned in the assembly cell for connection and progressive building of the vehicle body 58. The progression and removal of selected parts continues until the vehicle leaves the assembly line or lines, the parts on the cart are depleted or another predetermined condition is satisfied. In a preferred example, cart 100 includes parts that are sufficient to complete two full assembly lines, for example lines 40 and 42.

In step 270, when the cart 100 is empty, it is transferred back to the sequencing area 30 to be reloaded with the same vehicle parts, or parts for a different vehicle body, re-sequenced and transferred back to the assembly lines and the process is repeated.

The inventive sequenced part delivery system provides many advantages toward achieving a truly random vehicle build to provide for flexible manufacturing. The system at the same time greatly improves the logistics and congestion around assembly lines increasing efficiency, safety and virtually every other aspect of high-volume assembly.

The present invention relating to sequenced part delivery to support vehicle assembly may be combined with other assembly technologies to even further improve the efficiency of vehicle assembly plants. For example, at the assembly lines 40-50, robots can quickly change the end effectors used for a particular body style to accommodate the build of a different body style that may be next in the succession of vehicles to be build. For example, a weld gun for vehicle body type A may be different than the weld gun needed for a different body style due to different configuration of the vehicle body. The robot end effector can, automatically or with minimal assistance, disengage an operative weld gun needed for one body style and engage a different weld gun for a different body style, without having to stop the assembly line or delay advancement. An example of this is described in U.S. Patent Application Publication No. 2010/0180711 assigned to the Assignee herein and which is incorporated herein by reference. Also, other tooling positioned at the point of a build station 56 can quickly be moved or rotated out of position and be replaced by tooling useful for a different body style.

With the present invention, the sequenced delivery of parts to the assembly line, in combination with the flexible tooling changes described immediately above, greatly desensitizes the entire assembly system which was previously greatly dictated by the body style or sequence of body styles that were to be built.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for providing coordinated part delivery in a predetermined random build sequence for use in manufacturing assembly lines, the method comprising the steps of:
predetermining a sequence order of specific vehicles to be assembled, the sequence order including a random combination of at least a first vehicle style and a second vehicle style, the first vehicle style different from the second vehicle style;
gathering a plurality of individual vehicle build components for at least the first vehicle style and the second vehicle style;
loading selected of the gathered vehicle build components for one of the first vehicle style on one of a plurality of movable kit carts and selected of the gathered vehicle build components for one of the second vehicle style on another of the plurality of kit carts in an order matching the sequence order;
sequencing each of the plurality of loaded kit carts in sequential order such that its vehicle build components coordinate with a vehicle style to be assembled;
successively placing each of the plurality of loaded kit carts in proximity to a coordinating vehicle style to be assembled along at least one vehicle assembly line; and
progressively moving each loaded kit cart along with its coordinating vehicle style along the at least one assembly line and progressively removing selected vehicle build components therefrom at build stations along the at least one assembly line to progressively assemble at least a portion of a vehicle;
wherein the step of moving each loaded kit cart along the at least one assembly line further comprises the steps of:
moving a loaded kit cart along a first and a second assembly line
progressively removing selected vehicle build components from a first side of the loaded kit cart at build stations along the first assembly line,
upon reaching an end of the first assembly line, maneuvering the loaded kit cart to expose a second side of the loaded kit cart to the second assembly line, and
progressively removing selected vehicle build components from the second side of the loaded kit cart at build stations along the second assembly line.

2. The method of claim 1 further comprising the step of:
verifying each loaded kit cart has the desired vehicle build components for a coordinating vehicle style prior to placing the loaded kit cart in proximity to the coordinating vehicle style along the at least one assembly line.

3. The method of claim 2 wherein the step of verifying includes moving the loaded kit cart through the field of view of an electronic vision system.

4. The method of claim 1 wherein the step of moving each loaded kit cart further comprises the step of engaging a loaded kit cart with a powered conveying device substantially moving in coordinating sequence with its coordinating vehicle style being assembled.

5. The method of claim 4 wherein the step of engaging a loaded kit cart further comprises the step of docking the loaded kit cart with one of a powered conveyor or an automated guided vehicle (AGV).

6. The method of claim 1 wherein the step of moving each loaded kit cart along at least one assembly line further comprises the step of progressively moving a loaded kit cart along an assembly line in a cart path separate from the assembly line while progressively removing the selected vehicle build components from the loaded kit cart.

7. The method of claim 6 wherein the step of moving each loaded kit cart along at least one assembly line further comprises the steps of:
moving the at least a portion of a vehicle along an assembly line with a first conveying device defining an assembly line path of travel; and
progressively moving the loaded kit cart with a second conveying device defining the cart path, wherein the cart path is laterally distant from and adjacent to the assembly line path of travel.

8. The method of claim 6 wherein the cart path is elevated above a structure supporting the assembly line to define a vertical clearance adjacent the assembly line.

9. The method of claim 1 wherein the step of moving each loaded kit cart along the at least one assembly line further comprises the step of returning a loaded kit cart to be reloaded with vehicle build components following depletion of the loaded vehicle build components.

10. The method of claim 9 wherein the step of moving each loaded kit cart along the at least one assembly line further comprises the step of moving a loaded kit cart in a closed loop along two adjacent assembly lines.

11. The method of claim 10 further comprising the step of moving a loaded kit cart through a buffer area located between successive build stations along an assembly line to adjust for interruptions in movement of the assembly line.

12. The method of claim 10 wherein the at least one assembly line includes a plurality of assembly lines, and wherein the step of moving each loaded kit cart along the at least one assembly line further comprises the steps of:
progressively moving a loaded kit cart in a first of a plurality of individual closed loop cart paths along with its coordinating vehicle style along first and second adjacent assembly lines of the plurality of assembly lines; and
progressively moving another loaded kit cart in a second of the plurality of individual closed loop cart paths along with its coordinating vehicle style along third and fourth adjacent assembly lines of the plurality of assembly lines.

13. The method of claim 12 wherein the step of moving each loaded kit cart along the at least one assembly line further comprises the step of returning a loaded kit cart at one end of an individual closed loop cart path to be reloaded with vehicle build components following depletion of the loaded vehicle build components.

14. A method for providing coordinated part delivery in a predetermined random build sequence for use in manufacturing assembly lines, the method comprising the steps of:
predetermining a sequence order of specific vehicles to be assembled, the sequence order including a random combination of at least a first vehicle style and a second vehicle style, the first vehicle style different from the second vehicle style;

gathering a plurality of individual vehicle build components for at least the first vehicle style and the second vehicle style;

loading selected of the gathered vehicle build components for one of the first vehicle style on one of a plurality of movable kit carts and selected of the gathered vehicle build components for one of the second vehicle style on another of the plurality of kit carts in an order matching the sequence order;

sequencing each of the plurality of loaded kit carts in sequential order such that its vehicle build components coordinate with a vehicle style to be assembled;

successively placing each of the plurality of loaded kit carts in proximity to a coordinating vehicle style to be assembled along at least one vehicle assembly line; and progressively moving each loaded kit cart along with its coordinating vehicle style along the at least one assembly line and progressively removing selected vehicle build components therefrom at build stations along the at least one assembly line to progressively assemble at least a portion of a vehicle;

wherein the step of moving each loaded kit cart along the at least one assembly line further comprises the steps of:

moving a loaded kit cart along a first assembly line and progressively removing selected vehicle build components from the loaded kit cart at build stations along the first assembly line to progressively assemble the at least a portion of a vehicle, transferring the at least a portion of a vehicle from the first assembly line to the loaded kit cart, moving the loaded kit cart towards a second assembly line, transferring the at least a portion of a vehicle from the loaded kit cart to the second assembly line, and moving the loaded cart along the second assembly line and progressively removing selected vehicle build components from the loaded kit cart at build stations along the second assembly line to further progressively assemble the at least a portion of a vehicle.

15. The method of claim 14 further comprising the step of: verifying each loaded kit cart has the desired vehicle build components for a coordinating vehicle style prior to placing the loaded kit cart in proximity to the coordinating vehicle style along the at least one assembly line.

16. The method of claim 14 wherein the step of moving each loaded kit cart further comprises the step of engaging a loaded kit cart with a powered conveying device substantially moving in coordinating sequence with its coordinating vehicle style being assembled.

17. The method of claim 16 wherein the step of engaging the loaded kit cart further comprises the step of docking the loaded kit cart with one of a powered conveyor or an automated guided vehicle (AGV).

18. The method of claim 14 wherein the step of moving each loaded kit cart along at least one assembly line further comprises the step of progressively moving a loaded kit cart along an assembly line in a cart path separate from the assembly line while progressively removing the selected vehicle build components from the loaded kit cart.

19. The method of claim 18 wherein the step of moving each loaded kit cart along at least one assembly line further comprises the steps of:

moving the at least a portion of a vehicle along an assembly line with a first conveying device defining an assembly line path of travel; and progressively moving the loaded kit cart with a second conveying device defining the cart path, wherein the cart path is laterally distant from and adjacent to the assembly line path of travel.

20. The method of claim 18 wherein the cart path is elevated above a structure supporting the assembly line to define a vertical clearance adjacent the assembly line.

* * * * *